Figure 1:
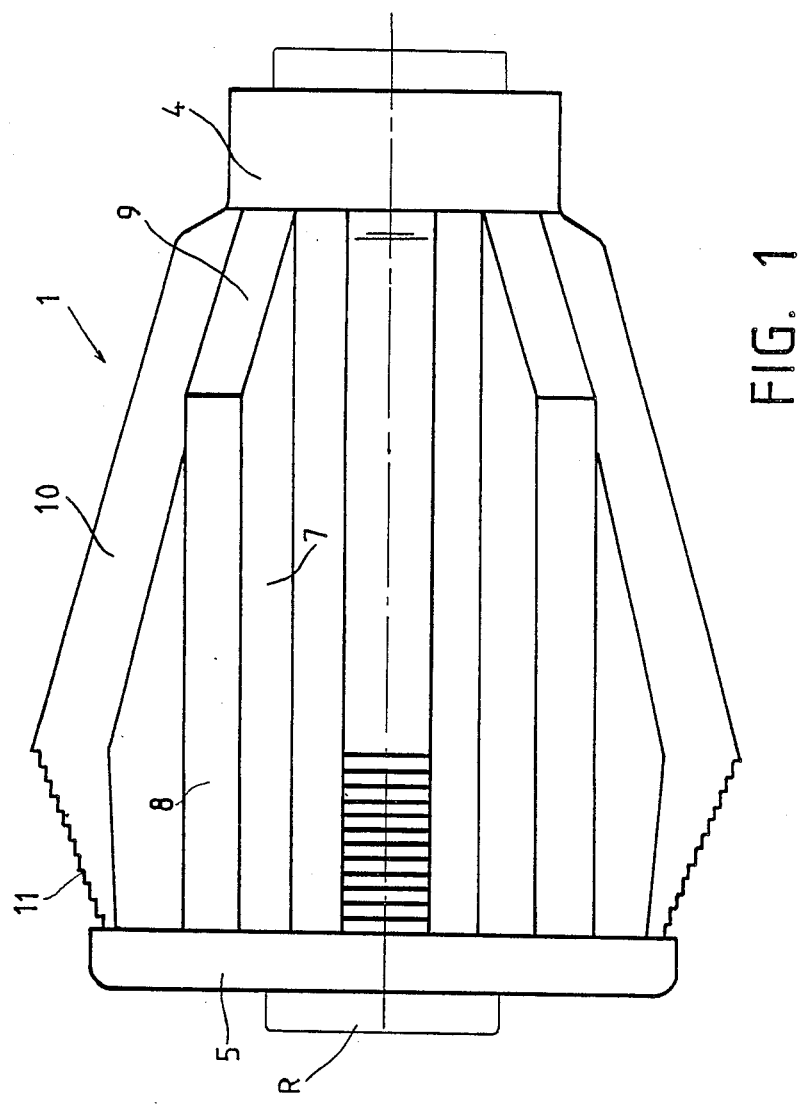

United States Patent [19]

Belisaire

[11] Patent Number: 4,981,310

[45] Date of Patent: Jan. 1, 1991

[54] DEVICE FOR FIXING AN ELEMENT PASSING THROUGH A WALL

[75] Inventor: Daniel Belisaire, Sévigné, France

[73] Assignee: Legris SA, Rennes, France

[21] Appl. No.: 451,809

[22] Filed: Dec. 15, 1989

[30] Foreign Application Priority Data

Dec. 16, 1988 [FR] France .................. 88 16880

[51] Int. Cl.$^5$ .................. F16L 3/04; F16L 5/00; F16L 43/00; F16B 19/00
[52] U.S. Cl. .................. 285/162; 285/194; 411/508; 411/913
[58] Field of Search .................. 411/508–510, 411/182, 913, 908; 24/297; 285/194, 162

[56] References Cited

U.S. PATENT DOCUMENTS

| 2,424,757 | 7/1947 | Klumpp, Jr. .................. 411/510 |
| 3,221,572 | 12/1965 | Swick . |
| 3,856,050 | 12/1974 | Rooney .................. 411/908 |
| 3,988,808 | 11/1976 | Poe et al. .................. 24/297 |
| 4,396,329 | 8/1983 | Wollar .................. 411/510 |
| 4,402,641 | 9/1983 | Arff .................. 411/510 |
| 4,431,355 | 2/1984 | Junemann .................. 411/508 |
| 4,621,937 | 11/1986 | Maccuaig . |
| 4,762,343 | 8/1988 | Hirohata .................. 285/194 |
| 4,787,795 | 11/1988 | Kraus .................. 411/510 |

FOREIGN PATENT DOCUMENTS

| 2226315 | 5/1972 | Fed. Rep. of Germany . |
| 2295287 | 7/1976 | France . |
| 2486176 | 1/1982 | France . |
| 1599743 | 10/1981 | United Kingdom . |
| 2181179 | 4/1987 | United Kingdom . |

Primary Examiner—Neill R. Wilson
Attorney, Agent, or Firm—Roland Plottel

[57] ABSTRACT

The device disclosed by the invention is associated with an element to be mounted in a wall, by insertion in a hole bored in the wall.

It comprises a longitudinal body (4), centring and lateral stabilizing means (7') and longitudinal locking means consisting of a collar (5') and peripheral resiliently retractable portions (10') having a step shaped cut-out (11') so as to form a succession of interrupted circular shoulders so that after insertion the edge of the reception hole in the wall is automatically engaged bweteen the collar (5') and the shoulder whose longitudinal spacing from the collar is the closest, upwardly, of the thickness of the wall.

The device may be integrated in the element to be fixed or consist of a sleeve (1'). With the device, an element may be quickly fixed while working from only one side of the wall.

11 Claims, 8 Drawing Sheets

DEVICE FOR FIXING AN ELEMENT PASSING THROUGH A WALL

The present invention relates to a device for fixing an element passing through a wall, such as a connection, a switch, an indicator light, etc... It relates more particularly to such a fixing device associated with a connection used in fluid circuits.

At the present time, the elements intended to pass through walls are generally provided with a collar and nut fixing means. Fixing these elements in the wall requires placing the element on one side of the wall and tightening the locking nut on the other side, which is not always practical.

An object of the invention consists in providing a means for facilitating this operation by making it possible while working from one side only of the wall, and automatic after insertion in a hole bored in the wall.

According to the invention, a fixing device associated with an element to be mounted in a wall, by insertion through a hole of appropriate diameter bored in the wall, comprises a longitudinal body, means for centring and laterally stabilizing it in the hole and a longitudinal locking means consisting of a collar and peripheral outwardly projecting portions, resiliently retractable inwardly and having a step shaped cut-out so as to form together a succession of interrupted circular peripheral shoulders oriented towards the collar, so that during insertion in the hole said peripheral portions retract then partially project again, the edge of the hole being engaged between the collar and the shoulder formed by said peripheral portions whose longitudinal spacing from the collar is the closest, upwardly, to the thickness of the wall, thus making possible automatic fixing in walls of different thicknesses.

Figure 2:
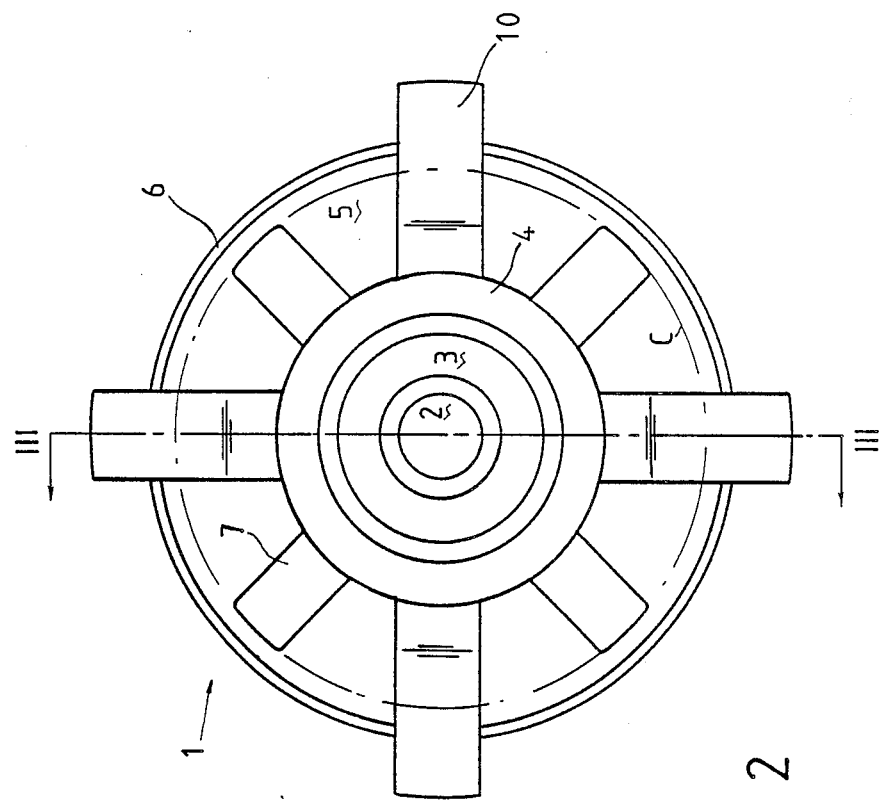
Figure 3A:
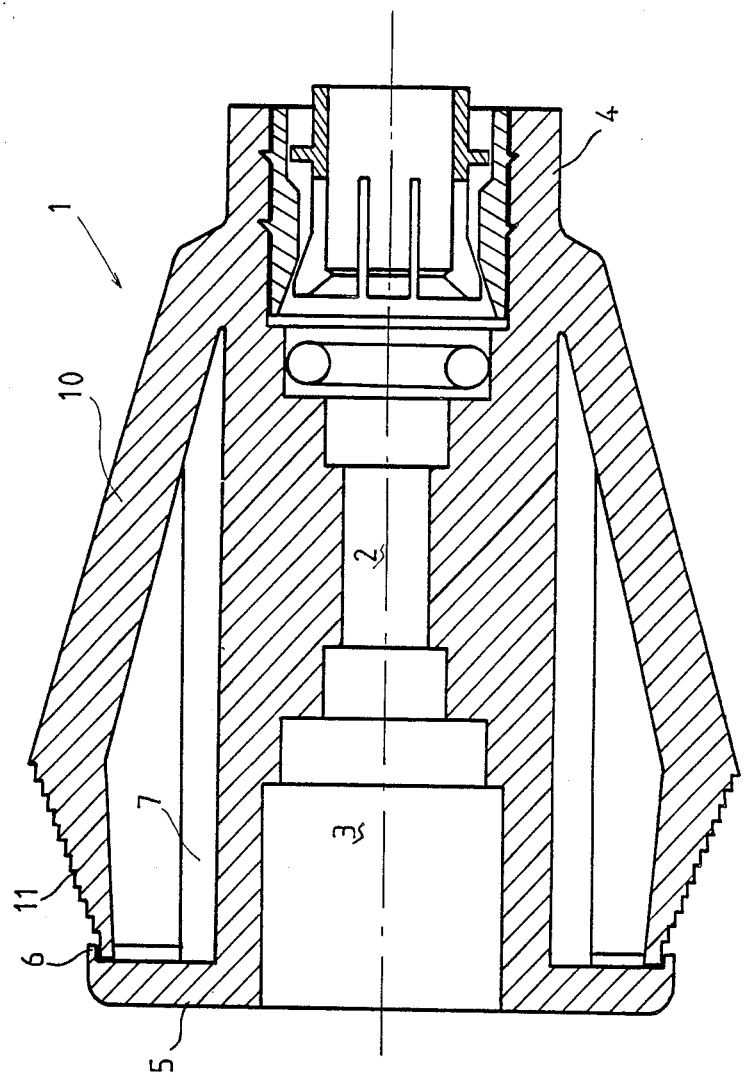
Figure 3B:
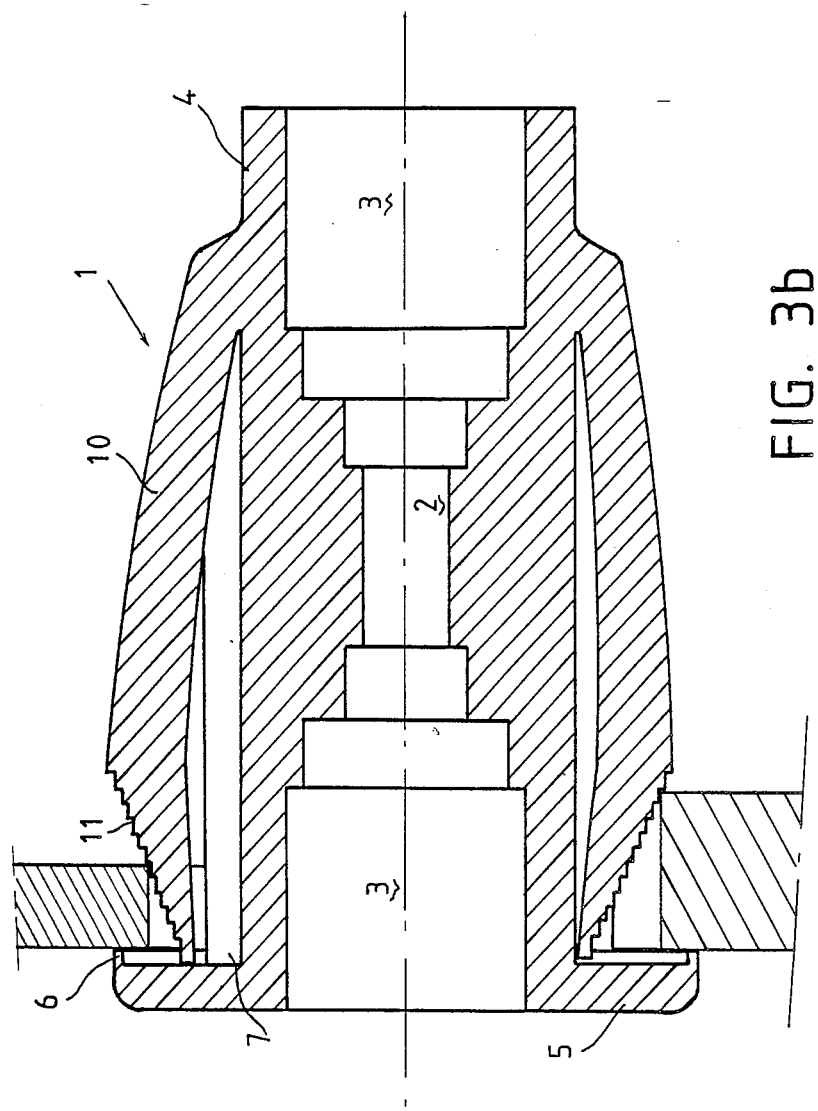
Figure 4:
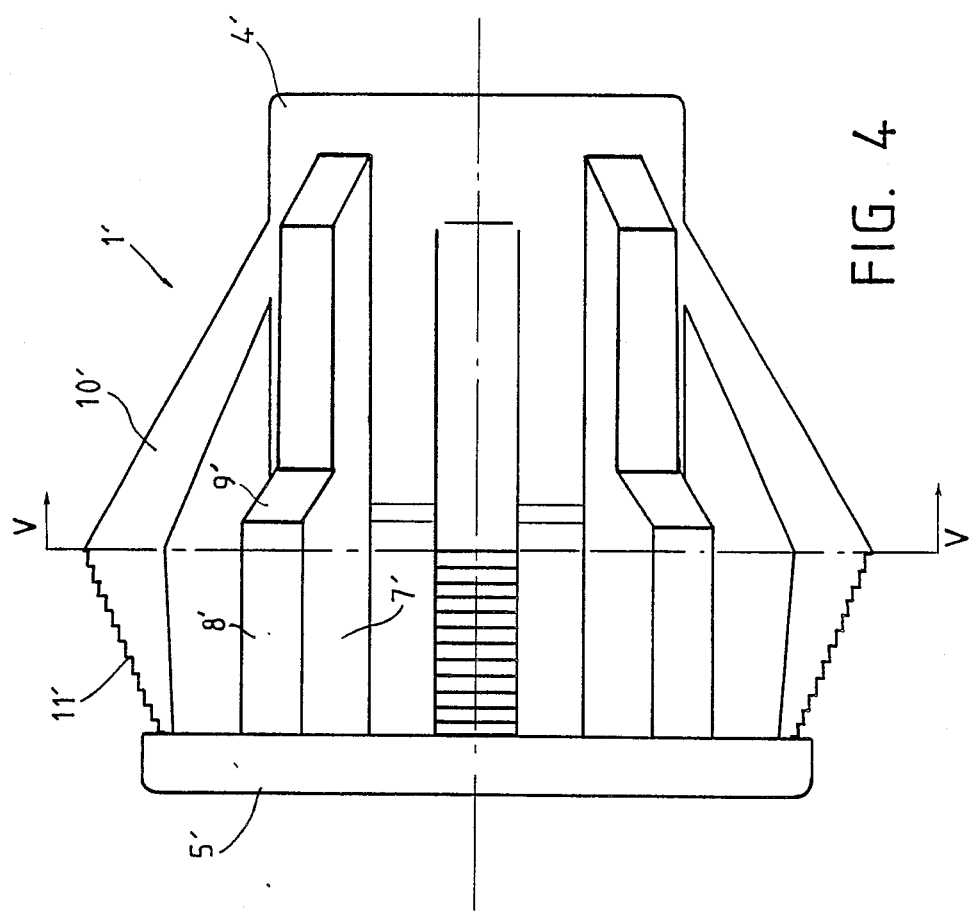
Figure 5:
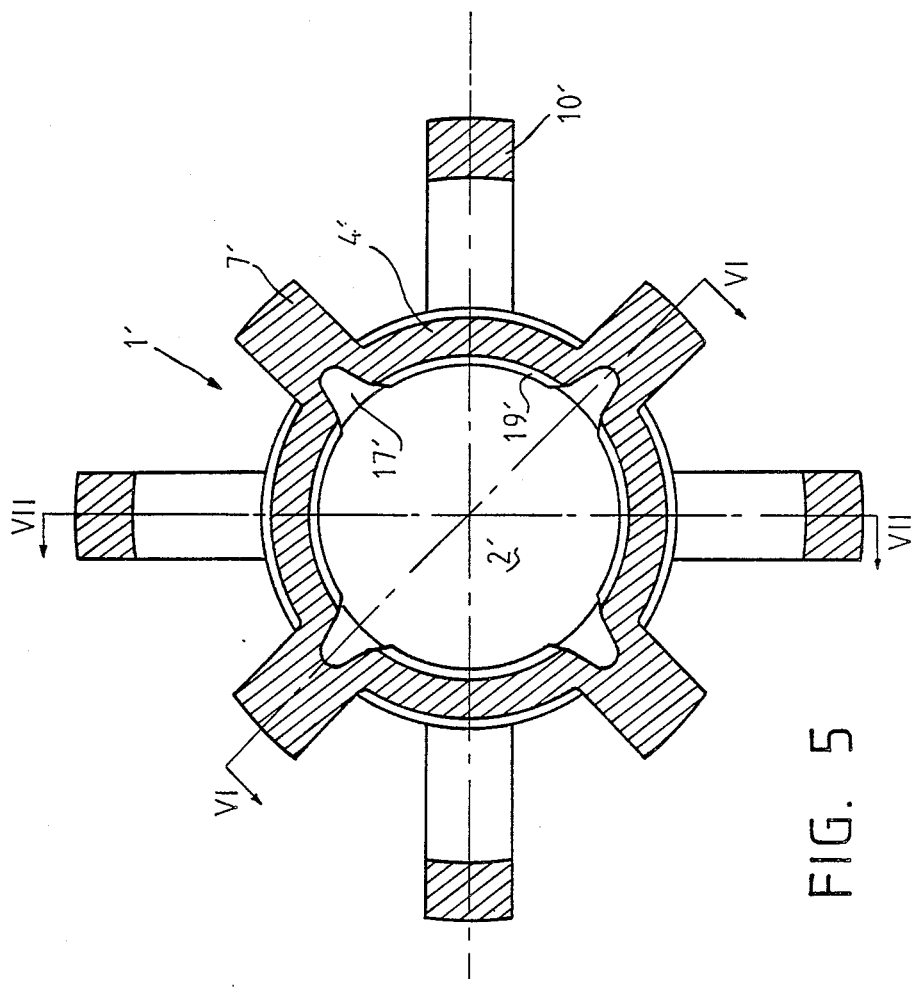
Figure 6:
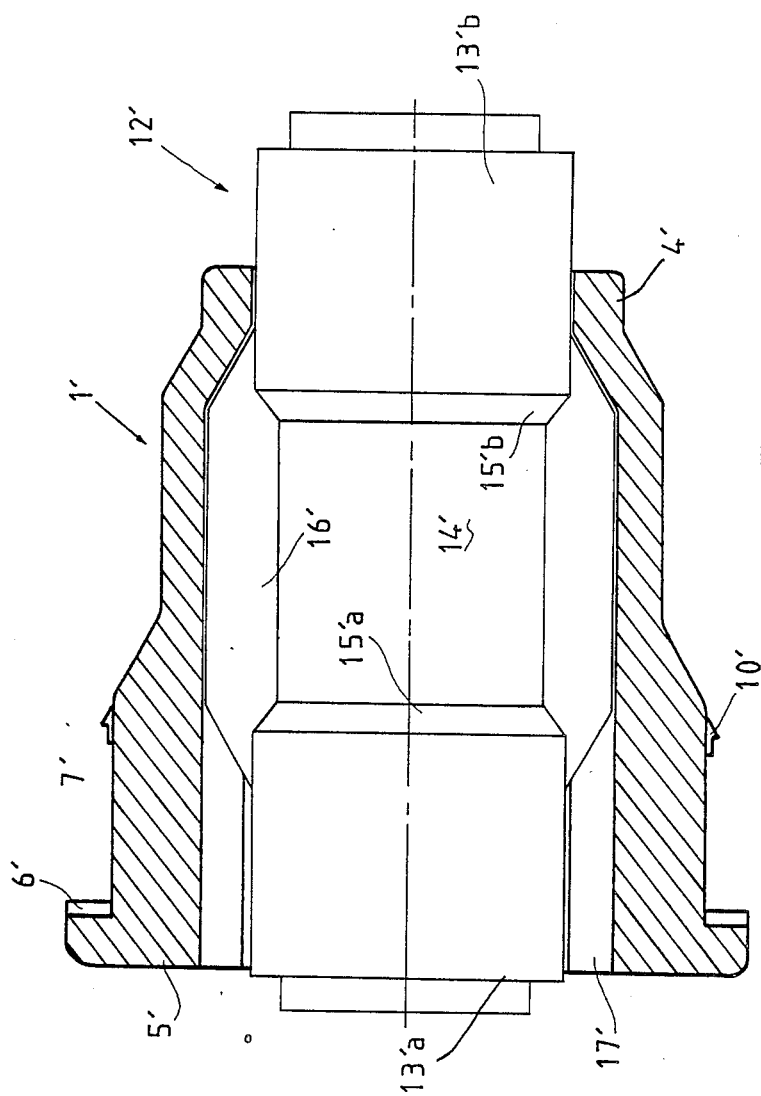
Figure 7:
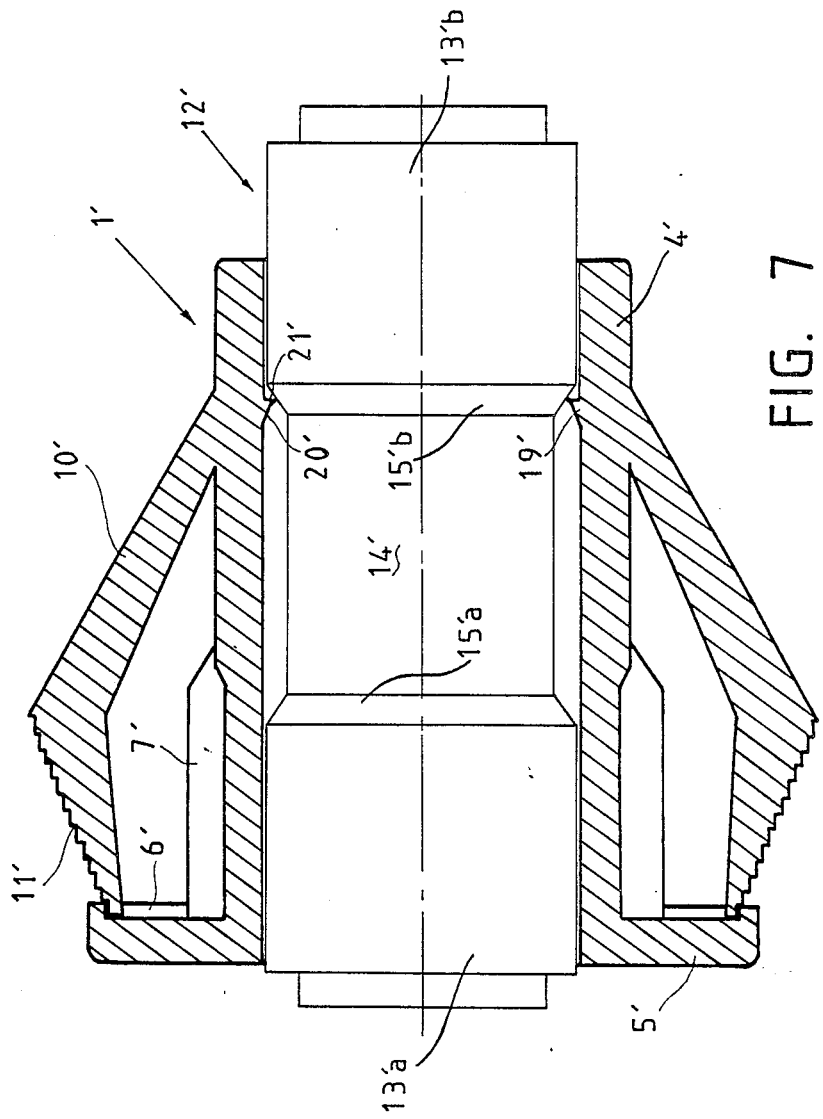

The invention will be better understood from the following explanations and the accompanying drawings, in which:

FIG. 1 is a side view of a snap connection having a fixing device in accordance with the invention, FIG. 2 is a schematic end view of the connection of FIG. 1, FIG. 3a is a schematic sectional view through line III—III of FIG. 2, FIG. 3b is a sectional view, substantially identical to that of FIG. 3a, but showing schematically the fixing device in an operating situation, FIG. 4 is a side view of the fixing device according to the, invention, forming a separate piece, FIG. 5 is a sectional view through line V—V of FIG. 4, FIG. 6 is a sectional view of the element of FIG. 4, through a line corresponding to the line VI—VI of FIG. 5, FIG. 7 is a sectional view of the element of FIG. 4 through a line corresponding to the line VII—VII of FIG. 5.

The connection 1 shown in FIGS. 1 to 3 is provided for passing a fluid circuit duct through a wall. As can be seen in FIG. 3, the inside of connection 1 comprises conventionally a median channel 2 communicating on each side with stepped cylindrical bores 3, which are open at the ends of the connection, and containing sealed connection means R, FIG. 1, for pipes not shown.

In the embodiment illustrated, bores 3 are intended to receive sealed snap connection means of the type described in French patent No. 2 102 796 in the name of the present Applicant, these means being shown schematically in FIG. 3a.

Connection 1 comprises a cylindrical portion 4 one end of which is provided with a collar 5 of substantially larger diameter. Collar 5 has a peripheral flange oriented longitudinally towards the other end of the connection.

Four longitudinal fins 7 project radially from the cylindrical portion 4, from collar 5. Fins 7 are spaced evenly apart about the periphery of the connection and, as shown in FIG. 1, they have a trapezoidal profile, their apex 8 being parallel to the longitudinal axis of the connection and their side 9 opposite collar 5 being slanted. The apices 8 of fins 7 are inscribed in a circumference C, FIG. 2, centred on the longitudinal axis of the connection 1, and whose diameter is very slightly less than the hole to be bored in the wall for reception of the connection 1.

Connection 1 further comprises four longitudinal lugs 10, spaced evenly apart at its periphery, between fins 7. Each lug 10 is fast with one end of the cylindrical portion of the connection, close to the end distant from collar 5. From this end, lug 10 is directed obliquely outwardly, so as to project radially at a certain distance beyond the circumference C in which the apices 9 of fins 7 are inscribed, then beyond the circumference of collar 5. Furthermore, the external face of the end portion of lugs 10, adjacent the collar 5, is cut out in the form of transverse steps 11, so that each group of corresponding levels of the four lugs 10 form an interrupted circular shoulder directed towards collar 5. Lugs 10 have their free ends flush with collar 5, inside the flange 6, and at rest they are urged against said flange 6 under the effect of their resilience. In another embodiment, collar 5, with or without flange 6, is interrupted at the level of lugs 10 whose free ends project fairly substantially outwardly beyond collar 5. This embodiment provides a better resilient return of lugs 10 during operation. In this case, an annular cap having a decorative function may be associated with collar 5. In all cases, such a cap may fulfil a signalling function, determined by the choice of its colour for example.

During positioning, when connection 1 is inserted by its end distant from collar 5 into a reception hole bored in a wall, it is first of all guided by the slanting sides 9 of fins 7, then it is centred and stabilized laterally by the apices 8 of said fins. During this time, lugs 10 close up resiliently when approaching the cylindrical portion 4 and again open out partially, still by resilience, until the edge of the hole in the wall is engaged between collar 5 and the group of corresponding levels 11 of lugs 10 whose longitudinal spacing from the peripheral edge 6 of collar 5 is the closest, upwardly, to the thickness of the wall. In this position, sleeve 1 is stabilized laterally in the hole by the apices 8 of fins 7 and it is locked longitudinally by collar 5 and lugs 10. Two such situations for different wall thicknesses are illustrated respectively by the upper and lower portions of FIG. 3b.

Of course, the stepped cut-out shape of the ends of lugs 10 will be provided so that the longitudinal spacing between the different groups of levels 11 and the edge of collar 5 are very close, upwardly, to the most usual wall thicknesses. Moreover, collar 5 may be provided on its internal face with a compressible and resilient annular element for accommodating any longitudinal play of the connection with respect to the wall. This will be particularly important in applications in which the connection is likely to be subjected to vibrations. The compressible element may be a flexible toric ring bonded to flange 6, for example, or the flange 6 itself if the resilience and characteristics of the material used for manufacturing the connection permit it. Flange 6 may then be interrupted, so as to have more flexibility.

In addition, although in the drawings a connection 1 has been shown in the non operating condition in which the different step levels 11 are in transverse planes, it is preferable to provide them slightly slanted with respect to the transverse direction so that, when they are operational, with the lugs partially closed, they are then effectively situated in transverse planes.

Sleeve 1' shown in FIGS. 4 to 7 is a self-contained fixing means, comprising an internal housing 2', FIG. 5, for a conventional connection whose profile is shown schematically in the sectional views of FIGS. 6 and 7.

The body of the sleeve has a portion 4' with a generally cylindrical shape, a collar 5' with a flange 6', fins 7' and lugs 10'. These elements are substantially identical to the corresponding elements of the connection of FIGS. 1 to 3 and operate in the same way, for which reason they will not be described further in detail.

Externally, the connection 12' for which sleeve 1 is intended and whose profile appears schematically in FIGS. 6 and 7, has two identical cylindrical end portions 13' and 13'b connected to a median cylindrical portion 14' of smaller diameter while forming respectively annular chamfered shoulders 15'a and 15'b. Around the median portion 14' are evenly spaced apart four longitudinal fins 16' whose ends are oblique and have their point of origin on each end cylindrical portion 13'a and 13'b.

The internal housing 2' is a cylindrical duct open at both its ends, of a diameter slightly greater than that of the end cylindrical portions 13'a and 13'b of connection 12'. Its surface has four evenly spaced longitudinal grooves 17' open at the end of the sleeve comprising collar 5'. On the other side, grooves 17' stop before the end of the sleeve, their bottom being slanted so as to form an oblique end 18'. In practice, grooves 17' are provided in the same angular position as fins 7' so as not to make it necessary to have specific extra thicknesses of the cylindrical portion 4' of the sleeve. Grooves 17', intended to receive the fins 16' of the connection 12', have a profile complementary to that of the fins.

In the vicinity and short of the slanting ends 18' of groove 17', a circular transverse rib 19' projects from the surface of housing 2'. Rib 19' is of course interrupted in four positions by grooves 17' and its section is triangular, as shown in FIG. 7, its side 20' oriented towards the opening adjacent collar 5' being slanted and its other side 21 being straight. The internal circumference defined by the edge of rib 19' has a diameter slightly less than that of the end portions 13' of connection 12'.

In use, connection 12' is inserted in sleeve 1' before or after the latter has been fixed in a wall, exactly in the same way as element 1 of FIGS. 1 to 3. Connection 12' is inserted by its end portion 13'b, FIGS. 6 and 7, in housing 2' by the opening of the sleeve adjacent collar 5', each fin 16' penetrating into a groove 17'. At a certain moment, the end portion 13'b inside housing 2' abuts against the slanting edge of rib 2'. Under the effect of an increased insertion pressure on the end of the other end portion 13'a, connection 12' continues to advance in sleeve 1', rib 19' being flattened by the external surface of the cylindrical wall 13'. Then, just before the fins 16' abut against the oblique end 18' of groove 17', the chamfered shoulder 15'b adjacent the portion 13'b of connection 21' arrives at the level of rib 19', so that the latter straightens up again because of its own resilience, to form a stop in contact with said chamfer when fins 16' reach the end 18' of grooves 17'. Consequently, connection 12' is locked in sleeve 1', which is secured against rotation by fins 16' in grooves 17' and longitudinally in both directions, by fins 16' abutting against the ends 18' of groove 17', on the one hand and by rib 19' abutting against the chamfered shoulder 15'b, on the other.

In another embodiment, the cylindrical body of the sleeve has longitudinal slits open at the end opposite the collar. An internal locking means, consisting of a peripheral rib, is associated with these slits for inserting the element to be fixed in the sleeve or removing it, through the end opposite the collar.

The device of the invention, whether integrated in the element to be fixed or forming a separate part, is advantageously manufactured by moulding plastic materials having appropriate resilience characteristics.

In addition, although here the device of the invention has been described in association with a connection, it will be readily understood that it may be fixed with all kinds of elements to be fixed in the body of a wall, such as control members, switches, indicator lamps, etc. . .

I claim:

1. A fixing device associated with an element to be mounted through a wall by insertion through a hole of appropriate diameter bored in the wall, which device comprises a longitudinal body (4; 4') and, on the latter, longitudinal locking means having a collar (5; 5') and peripheral outwardly projecting portions (10—10') which are resiliently retractable inwardly and have a step shaped cut-out (11; 11') so as to form a succession of interrupted circular peripheral shoulders oriented towards the collar (5; 5'), so that during insertion in the hole said peripheral portions retract then partially project again, the edge of the hole being engaged between the collar (5; 5') and the shoulder formed by said peripheral portions whose longitudinal spacing from the collar (5; 5') is closest to the thickness of the wall, thus making possible the fixing of the device in the walls of different thicknesses, wherein: said longitudinal body (4; 4') is a sleeve which lodges said element to be mounted through the wall, longitudinal fins (7; 7') extending from the collar (5, 5') on the periphery of the longitudinal body (4; 4'), between said stepped peripheral portions, the apices of said fins (7; 7') being inscribed in a circumference (C) of a diameter less than those of the interrupted circular shoulders formed by said stepped peripheral portions, said fins forming means for centering and laterally stabilizing the device in the reception hole in the wall and further defining, between and around the body (4; 4'), spaces in which said stepped peripheral portions penetrate during insertion of the device.

2. Device according to claim 1, characterized in that the ends (9; 9') of the fins (7; 7') distant from the collar (5; 5') are oblique for guiding centring during insertion.

3. Device according to claim 1, characterized in that said peripheral portions are resilient longitudinal lugs (10;10') whose ends distant from the collar (5;5') are fast with the longitudinal body (4;4') and whose free ends have said stepped cut-out shape (11;11').

4. Device according to one of claims 1, 2, or 3, characterized in that said element (1) is a fluid tube connection.

5. Device according to claim 4, characterized in that the longitudinal body (4) comprises a central canal (2) communicating with stepped bores (3) open to each extremity of the body and lodging sealing connecting means (R) for tubes.

6. Device according to claim 1, or 2, or 3 characterized in that the longitudinal body (4') forms a sleeve whose inside (2') comprises means for guiding and locking the element to be fixed.

7. Device according to claim 6, characterized in that the element to be fixed is a connection (12') formed of two cylindrical end portions (13'a, 13'b) separated from a central portion (14') by two annular chamfered surfaces (15'a, 15'b), and having peripheral longitudinal fins (16'), and in that said guide and locking means consist of longitudinal grooves (17') receiving the fins (16') and a rib (19') of triangular section capable of retracting during insertion of the element (12') in the sleeve and forming a stop acting against one of the chamfered surfaces (15'a, 15'b) when the fins (16') abut against the bottom of the grooves (17').

8. Device according to claim 6, characterized in that the cylindrical body (4') has longitudinal slits open at the end opposite the collar (5') so as to permit insertion or removal of the element to be fixed through the end of the sleeve opposite the collar (5').

9. Device according to one of claim 1 or 2, characterized in that the collar ((5;5') is associated with an annular cap having a decorative and/or signalling function.

10. Device according to claim 1 or 2, characterized in that the collar (5;5') is provided on its internal face with a flexible annular element for accommodating any longitudinal play with respect to the wall on which it is placed.

11. A device to be fixed to a hole in a wall comprising:
- a hollow sleeve (4) adapted to fit into the hole in the wall;
- a collar (5) at one end of the sleeve and extending radially outward beyond the hold size and adapted to press against the wall adjacent to the hole;
- a plurality of fins (7) extending radially outward from the sleeve from said one end where fins have a first portion with a height approximately equal to the hole size, and a second portion sloping (9) towards the other end of the sleeve;
- a plurality of lugs (10) cantilevered from said other end of the sleeve and extending normally radially beyond the height of said fins with cantilevered ends under an edge (6) of said collar, and having a plurality of transverse steps (11) in the regions adjacent said cantilevered ends;
- whereby when the device is pushed into the hole in the wall with the other end entering the hole first until the collar comes to rest against the wall adjacent the hole, the lugs are displaced axially inwardly by the inside the hole with a transverse step on each lug holding the device against the other side of the wall in the region adjacent the hole.

* * * * *